United States Patent
Williams et al.

(10) Patent No.: US 8,922,875 B2
(45) Date of Patent: Dec. 30, 2014

(54) METHOD FOR OPTICAL PHASE MODULATION, OPTICAL PHASE MODULATOR AND OPTICAL NETWORK USING THE SAME

(71) Applicants: Daisy Williams, Kanata (CA); Xiaoyi Bao, Ottawa (CA); Liang Chen, Ottawa (CA)

(72) Inventors: Daisy Williams, Kanata (CA); Xiaoyi Bao, Ottawa (CA); Liang Chen, Ottawa (CA)

( * ) Notice: Subject to any disclaimer, the term of this patent is extended or adjusted under 35 U.S.C. 154(b) by 148 days.

(21) Appl. No.: 13/633,749

(22) Filed: Oct. 2, 2012

(65) Prior Publication Data

US 2013/0084076 A1    Apr. 4, 2013

Related U.S. Application Data

(60) Provisional application No. 61/542,774, filed on Oct. 3, 2011.

(51) Int. Cl.
| | |
|---|---|
| *G02F 1/01* | (2006.01) |
| *H01S 3/30* | (2006.01) |
| *H04B 10/556* | (2013.01) |
| *G02F 1/35* | (2006.01) |
| *H01S 3/10* | (2006.01) |

(52) U.S. Cl.
CPC ............. *H01S 3/302* (2013.01); *G02F 1/0126* (2013.01); *G02F 2203/50* (2013.01); *G02F 1/0115* (2013.01); *H04B 10/5561* (2013.01); *G02F 1/353* (2013.01); *H01S 3/10053* (2013.01)
USPC .......................................... 359/334; 359/244

(58) Field of Classification Search
CPC ......... H01S 3/30; H01S 3/302; G02F 1/3534; G02F 1/0126; G02F 1/011; G02F 1/0115
USPC .................................................. 359/344, 244
See application file for complete search history.

(56) References Cited

U.S. PATENT DOCUMENTS

| | | | | |
|---|---|---|---|---|
| 4,530,097 | A * | 7/1985 | Stokes et al. | 372/6 |
| 4,817,207 | A * | 3/1989 | Smith et al. | 398/185 |
| 4,958,908 | A * | 9/1990 | Rockwell et al. | 359/300 |

(Continued)

OTHER PUBLICATIONS

Chen, Liang, et al; Analytical and Numerical Solutions for Steady State Stimulated Brillouin Scattering in a Single-mode Fiber; Optics Communications, Jun. 15, 1998, pp. 65-70, vol. 152, University of New Brunswick, Fredericton, New Brunswick, Canada.

(Continued)

*Primary Examiner* — Ari M Diacou
(74) *Attorney, Agent, or Firm* — IP-Mex Inc.; Victoria Donnelly (57) ABSTRACT

An optical phase modulator based on the principles of stimulated Brillouin scattering is disclosed. The optical phase modulator uses a pump wave and a probe wave counte-propagating in an optical fiber, whose frequencies are chosen such that a difference thereof differs from a resonant Brillouin frequency of the optical fiber. The pump wave is amplitude modulated prior to injecting into the optical fiber, causing phase modulation of the probe wave inside and at the exit from the optical fiber. Alternatively, the probe wave can be amplitude modulated, thereby causing a phase modulation of the pump wave. In the embodiments of the invention, the pump wave is a continuous wave, and the probe wave is a pulse Stokes wave or an anti-Stokes wave. A corresponding optical network using the phase modulator is also disclosed.

24 Claims, 6 Drawing Sheets

(56) References Cited

U.S. PATENT DOCUMENTS

| | | | |
|---|---|---|---|
| 5,113,282 A * | 5/1992 | O'Meara et al. | 359/241 |
| 5,351,252 A * | 9/1994 | Toyama et al. | 372/29.021 |
| 5,383,207 A * | 1/1995 | Culverhouse et al. | 372/28 |
| 5,515,192 A * | 5/1996 | Watanabe | 398/198 |
| 5,596,667 A * | 1/1997 | Watanabe | 385/122 |
| 5,598,289 A * | 1/1997 | Watanabe | 398/177 |
| 5,857,048 A * | 1/1999 | Feuer et al. | 385/88 |
| 5,917,179 A * | 6/1999 | Yao | 250/227.11 |
| 6,178,036 B1 * | 1/2001 | Yao | 359/334 |
| 6,204,951 B1 * | 3/2001 | Coward et al. | 359/245 |
| 6,417,956 B1 * | 7/2002 | Pedersen | 359/334 |
| 6,417,957 B1 * | 7/2002 | Yao | 359/334 |
| 6,476,959 B2 * | 11/2002 | Yao | 359/334 |
| 6,535,328 B2 * | 3/2003 | Yao | 359/334 |
| 6,600,593 B2 * | 7/2003 | Pedersen | 359/334 |
| 6,621,619 B2 * | 9/2003 | Strutz et al. | 359/334 |
| 6,766,070 B2 * | 7/2004 | Williams et al. | 385/3 |
| 6,819,879 B1 * | 11/2004 | Wan | 398/199 |
| 8,054,525 B2 * | 11/2011 | Okuno | 359/244 |
| 8,472,486 B1 * | 6/2013 | Henry et al. | 372/3 |
| 2001/0024317 A1 * | 9/2001 | Yao | 359/334 |
| 2001/0030796 A1 * | 10/2001 | Yao | 359/334 |
| 2002/0145794 A1 * | 10/2002 | Pedersen | 359/337 |
| 2003/0142392 A1 * | 7/2003 | Strutz et al. | 359/337.2 |
| 2009/0231681 A1 * | 9/2009 | Du | 359/334 |

OTHER PUBLICATIONS

Hui, R. et al; All-Optical Phase Modulation in a Traveling Wave Semiconductor Laser Amplifier; IEEE Photonics Technology Letters, Jul. 1994, pp. 808-810, vol. 6, No. 7, Canada.

Jenoptik AG; Phase Modulators—Optical Systems; http://www.jenoptik.com/en-phase-modulator; Oct. 2, 2011, pp. 1-2.

Jenoptik Optical Systems GmbH; Integrated-optical Modulators; Optoelectronic Systems; Oct. 2, 2011, pp. 1-24, Germany.

Jenoptik Optical Systems GmbH; Integrated Optical Phase Modulator, Waveguide-based electro-optical light modulator; Oct. 2, 2011, pp. 1-2; Germany.

Thorlabs; 10G-phase modulator, Lithium Niobate Modulators; http://thorlabs.com/newgrouppage9.cfm?objectgro . . . ; Oct. 2, 2011, pp. 1-3.

Thorlabs; 40Gb/s-phase modulator, Lithium Niobate Modulators; http://thorlabs.com/newgrouppage9.cfm?objectgro . . . ; Oct. 2, 2011, pp. 1-2.

Wikipedia, Electro-optic modulator; http://en.eikipedia.org/w/index.php?title=Electro-optic . . . ; Sep. 18, 2011, pp. 1-4.

* cited by examiner

METHOD FOR OPTICAL PHASE MODULATION, OPTICAL PHASE MODULATOR AND OPTICAL NETWORK USING THE SAME

RELATED APPLICATIONS

This application claims priority from U.S. provisional application 61/542,774 filed on Oct. 3, 2011 for "Optical Phase Modulator and Optical Network Using the Same", entire contents of which are incorporated herein by reference.

FIELD OF THE INVENTION

The present invention relates to methods of optical phase modulation, optical phase modulators and optical networks using phase modulation, and in particular to the optical phase modulator based on the principles of stimulated Brillouin scattering (SBS) and an optical network using the same.

BACKGROUND OF THE INVENTION

At present, there exists a multitude of electro-optic modulators (EOM), which are used to modulate the amplitude, frequency, phase and polarization of a beam of light. Among these, phase modulation provides the highest quality of transmitted signal, though at the expense of a widened spectrum. In view of the benefits, optical phase modulation has various applications in the field of optical networks and data transmission.

The most common phase modulator uses a Lithium Niobate crystal ($LiNbO_3$), which has an index of refraction that depends linearly on the applied electric field, and a phase linearly dependent on the index of refraction. As the electric field changes, the resulting phase is modulated. The achievable variation of the refractive index in Lithium Niobate is relatively small, requiring either large voltages or long electrode lengths to obtain sufficient phase modulation. Such modulators may also perform the task of amplitude modulation.

ThorLabs™, for example, produces Lithium Niobate phase modulators made of Titanium Indiffused Z-Cut $LiNbO_3$, which are especially designed to be integrated into transponders. The Lithium Niobate component is required for all-optical frequency shifting, and applications such as sensing and data encryption. These phase modulators are designed to operate in the 1550 nm range.

Jenoptik™ produces integrated optical phase modulators, which employ a combination of Magnezium oxide (MgO) and Lithium niobate (LiNbO3) crystals to realize phase modulation in the GHz range. An advancement with Jenoptik™ phase modulators is that a relatively low modulation voltage is required to achieve the desired phase modulation, thus being suitable for wavelengths in the visible and infrared spectral range.

Other methods of optical phase modulation have also been employed. For example, optical phase modulation has been achieved in a traveling wave semiconductor laser amplifier, see paper by Hui, R. Jiang, Q. Kavehrad, M. Makino, T., "All-optical phase modulation in a traveling wave semiconductor laser amplifier", IEEE Photonics Technology Letters 1994, vol 6(7). In this paper, the optically controlled phase modulation is independent of the signal wavelength.

In spite of advances made in the area of optical phase modulation, there is still a need in the industry for developing further improvements and alternative methods of optical phase modulation and optical networks using the same, which would avoid or mitigate the disadvantages of the existing prior art.

SUMMARY OF THE INVENTION

There is an object of the present invention to provide a method of optical phase modulation and an optical phase modulator based on stimulated Brillouin scattering (SBS), and an optical network using such phase modulator.

According to one aspect of the invention, there is provided a method for optical phase modulation, comprising:

injecting a pump wave into one end of an optical fiber, and a probe wave into an opposite end of the optical fiber, such that the pump wave and the probe wave counter-propagate in the optical fiber, the pump wave and the probe wave being selected such that to cause stimulated Brillouin scattering in the optical fiber;

choosing frequencies of the pump wave and the probe wave prior to the injecting such that a difference thereof differs from a resonant Brillouin frequency of the optical fiber; and phase modulating the probe wave or the pump wave by respectively amplitude modulating the pump wave or the probe wave prior to the injecting.

In the method described above, the step of injecting the probe wave comprises injecting a Stokes wave, or comprises injecting an anti-Stokes wave.

In the method described above, the step of the amplitude modulating comprises amplitude modulating the pump wave only, thereby phase modulating the probe wave; or comprises amplitude modulating the probe wave only, thereby phase modulating the pump wave.

In the method described above, the step of choosing comprises one of the following:

detuning the frequency of the probe wave from the resonant Brillouin frequency; or detuning the frequency of the pump wave from the resonant Brillouin frequency; or detuning the frequency of both the pump wave and the probe wave from the resonant Brillouin frequency.

In the embodiments of the invention, it has been noticed that absolute values of phase changes of the phase modulated wave are larger if the difference between frequencies of the pump wave and the probe wave is about half of a Brillouin linewidth of the optical fiber. Conveniently, the difference may be chosen within a range of about +/−25% from half a Brillouin linewidth.

It has been also noticed that when the pump wave is amplitude modulated and Stokes or anti-Stokes wave is phase modulated, the absolute values of the phase modulation are larger when the pump wave is noticeably depleted, for example by about 50% or larger. For selected parameters of pump and probe wave, there seem to be a certain depletion, after which phase changes of the phase modulated wave are of substantially larger magnitude.

In the embodiments of the invention described above, the step of choosing comprises choosing frequencies of the pump and probe waves suitable for telecommunications purposes, for example corresponding to wavelengths around 1.5 micron.

According to another aspect of the present invention, there is provided an optical phase modulator, comprising:

an optical fiber;

a pump laser source, injecting a pump wave into one end of the optical fiber;

a probe laser source, injecting a probe wave into an opposite end of the optical fiber, such that the pump wave and the probe wave counter-propagate in the optical fiber;

the pump wave and the probe wave being selected to cause stimulated Brillouin scattering in the optical fiber, and frequencies of the pump wave and the probe wave being selected so that a difference thereof differs from a resonant Brillouin frequency of the optical fiber; and an amplitude modulator, causing a phase modulation of the probe wave or the pump wave by respectively amplitude modulating the pump wave or the probe wave prior to the injecting.

In the optical phase modulator described above, the amplitude modulator may comprise an amplitude modulator to amplitude modulate the pump wave only, thereby phase modulating the probe wave; or an amplitude modulator to amplitude modulate the probe wave only, thereby phase modulating the pump wave.

In the embodiments of the invention, the probe laser source is a fixed wavelength laser source, or conveniently, a tunable laser source configured to generate the probe wave, which is a Stokes wave. Alternatively, the same or another fixed or tunable laser source may be used to generate the probe wave, which is an anti-Stokes wave.

In the optical phase modulator described above:

the probe laser source may be a tunable laser source configured to detune the frequency of the probe wave from the resonant Brillouin frequency; or alternatively, the pump laser source may be another tunable laser source configured to detune the frequency of the pump wave from the resonant Brillouin frequency; or yet alternatively, both the probe laser source and the pump laser source may be tunable laser sources configured to detune the frequency of both the pump wave and the probe wave from the resonant Brillouin frequency.

Conveniently, said tunable laser source, said another tunable laser source and said tunable laser sources are configured to tune the difference to about half of a Brillouin linewidth of the optical fiber. For example, said tunable laser source, said another tunable laser source and said tunable laser sources may be configured to tune the difference to a range of about +/−25% from half of a Brillouin linewidth.

The optical phase modulator of the embodiments of the present invention may be implemented and used for various purposes, for example in an optical network for phase modulating optical signals to be transmitted over the optical network. For example, the phase modulator of the embodiments of the invention may be implemented in a node of the optical network.

According to yet another aspect of the present invention, there is provided a method for transmitting a phase modulated optical signal in an optical network, comprising:

(a) at a transmitting end of the optical network, phase modulating an optical signal according to the method of phase modulating as described above to produce the phase modulated optical signal;

(b) transmitting the phase modulated optical signal over a path in the optical network; and (c) at a receiving end of the optical network, demodulating the phase modulated optical signal transmitted over the network.

In the method described above:

the step (b) further comprises transmitting a reference optical signal, which is coherent with said optical signal, over the same path in the optical network; and the step (c) further comprises demodulating the phase modulated optical signal using the reference optical signal.

If the phase modulated signal and the reference signal are pulse signals, the transmitting of the reference wave need to be performed in synchronization (coherence) with the transmitting of the phase modulated optical signal.

In the method described above, the step (a) further comprises:

(i) splitting an optical signal from a laser source into a first optical signal and a second optical signal;

(ii) the phase modulating one of the first optical signal or second optical signal to produce the phase modulated optical signal, the other one splitted unmodulated optical signal being a reference optical signal.

In the method described above:

the step (b) further comprises:

(iii) rotating a polarization of one of the phase modulated optical signal or the reference signal substantially perpendicular to each other prior to the transmitting; and the step (c) further comprises:

(iv) double rotating the polarization of said one of the phase modulated optical signal or the reference signal substantially parallel to each other;

(v) superimposing the phase modulated signal and the reference optical signal having parallel polarizations to produce an interference pattern of variable intensity; and (vi) detecting intensity of the interference pattern.

According to yet another aspect of the invention, there is provided a method for optical phase modulating, comprising:

injecting a pump wave into one end of an optical fiber, and a probe wave into an opposite end of the optical fiber, such that to make the pump wave and the probe wave counter-propagate in the optical fiber, the pump wave and the probe wave being selected such that to cause stimulated Brillouin scattering in the optical fiber, the probe wave being one of a Stokes wave or an anti-Stokes wave;

choosing frequencies of the pump wave and the probe wave prior to the injecting such that a difference thereof differs from a resonant Brillouin frequency of the optical fiber by about half of a Brillouin linewidth of the optical fiber; and phase modulating the probe wave by amplitude modulating the pump wave prior to the injecting.

Thus, the method of optical phase modulation and the optical phase modulator based on stimulated Brillouin scattering (SBS) have been provided, as well as the optical network using such phase modulator.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

The embodiments of the invention describe a method for optical phase modulation based on principles of stimulated Brillouin scattering (SBS), a corresponding optical phase modulator, and an optical network using such modulator.

Inventors of this application have noticed the following:
provided a pump wave is injected into one end of an optical fiber, and a probe wave is injected into an opposite end of the optical fiber, such that the pump wave and the probe wave counter-propagate in the optical fiber, and the pump wave and the probe wave are selected such that to cause stimulated Brillouin scattering in the optical fiber; and provided frequencies of the pump wave and the probe wave are chosen so that a difference of the frequencies differs from a resonant Brillouin frequency of the optical fiber;

then it is possible to phase modulate the probe wave or the pump wave by respectively amplitude modulating the pump wave or the probe wave prior to the injecting.

Thus, a simple yet efficient method of optical phase modulation has been provided. An optical phase modulator has been also built based on these principles of optical phase modulation, as well as a corresponding optical network containing such optical phase modulator.

Theory

Embodiments of the present invention present new results on the phase relationships between a pump wave, or Continuous wave (CW), and a probe wave, or a Stokes wave (SW), during amplification of the Stokes wave in an optical fiber. The pump wave and the probe wave are selected such that to cause stimulated Brillouin scattering in the optical fiber. Alternatively, an anti-Stokes wave (ASW) may also be used instead of, or in addition to, the Stokes wave. The CW, SW and ASW may also be a pulsed waves, with pulse lengths greater than the phonon relaxation time.

Figure 1:
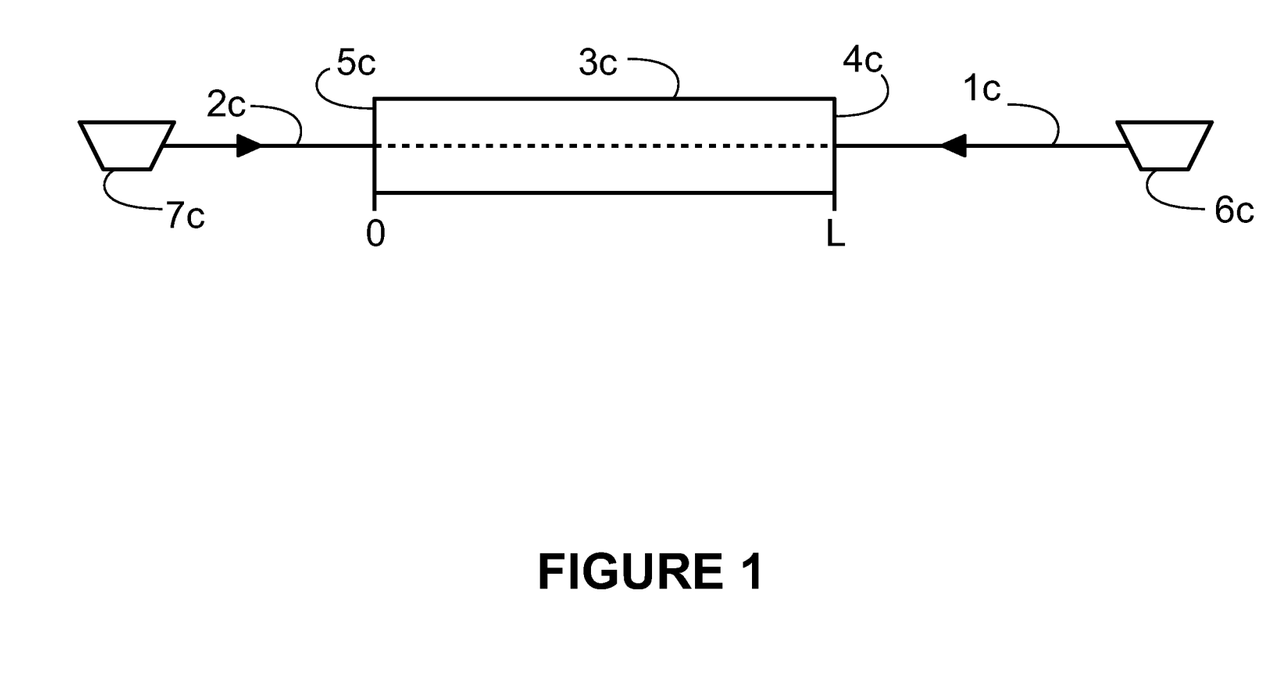
FIG. 1 is a schematic illustration of the interaction of the pump and probe waves, generated by pump and probe laser sources, inside of an optical fiber, in the process of Brillouin amplification.

The study of the phase distribution of the interacting waves has been undertaken for the case of a pump wave (1c) and a probe wave (2c) interaction inside of an optical fiber (3c) of length L, in the process of Brillouin amplification, which is depicted in the schematic arrangement shown on FIG. 1.

The pump wave (1c) is injected into one end of the optical fiber (4c), while the probe wave (2c), which is either a Stokes wave or an anti-Stokes wave, is injected into the opposite end of the optical fiber (5c). In both cases, the pump wave (1c) and the probe wave (2c) counter-propagate in the optical fiber (3c), and are selected to cause stimulated Brillouin scattering (SBS) in the optical fiber (3c).

The pump wave is generated by a pump laser source (6c), which may be a tunable laser source generating light at about 1549.4 nm, followed by an erbium-doped fiber amplifier (EDFA). The probe wave (2c) is generated by a probe laser source (7c), which may also be another tunable laser source, or an erbium doped fiber laser. The frequency difference between the pump and probe waves, (1c) and (2c) respectively, is controlled with a phase locked loop which (not shown), locked to the resonant Brillouin frequency, $\Omega_B$, of the fiber under test. The optical fiber (3c) is a standard single-mode polarization maintaining (PM) optical fiber, such as those manufactured by Corning corporation.

The interaction between the CW, SW, and an acoustic wave ($AW_1$), created due to electrostriction in the optical fiber (3c), is described by the following system of equations describing the SBS in the optical fiber, under the slowly varying amplitude approximations, and negligible attenuation, see, for example, Chen, L., Bao X. "Analytical and Numerical Solutions for Steady State Stimulated Brillouin Scattering in a Single-Mode Fiber", Optics Communications, 1998, vol. 152 (1-3), p. 65-70:

$$-\frac{\partial A_1}{\partial z} - \frac{i\omega_1 \gamma_e}{2nc\rho_0} \rho_1 A_2 \qquad \text{(eq. 1.1)}$$

$$\frac{\partial A_2}{\partial z} = \frac{i\omega_2 \gamma_e}{2nc\rho_0} \rho_1 A_1 \qquad \text{(eq. 1.2)}$$

$$(\Omega_B^2 - \Omega_1^2 - i\Omega_1 \Gamma_B)\rho_1 = \frac{\gamma_e q^2}{4\pi} A_1 A_2 \qquad \text{(eq. 1.3)}$$

Similarly, the interaction between the CW, ASW, and the corresponding acoustic wave ($AW_2$) is described by the following system of equations:

$$-\frac{\partial A_1}{\partial z} - \frac{i\omega_1 \gamma_e}{2nc\rho_0} \rho_2 A_3 \qquad \text{(eq. 2.1)}$$

$$\frac{\partial A_3}{\partial z} = \frac{i\omega_3 \gamma_e}{2nc\rho_0} \rho_2 A_1 \qquad \text{(eq. 2.2)}$$

$$(\Omega_B^2 - \Omega_1^2 - i\Omega_2 \Gamma_B)\rho_2 = \frac{\gamma_e \omega_1^2 n^2}{\pi c^2} A_3 A_1 \qquad \text{(eq. 2.3)}$$

where
$\Omega_1 = \omega_1 - \omega_2$; $\Omega_2 = \omega_3 - \omega_1$
$\Omega_1$—angular frequency of the $AW_1$ caused by interaction of CW & SW
$\Omega_2$—angular frequency of the $AW_2$ caused by interaction of CW & ASW
$A_1$—complex amplitude of the CW
$A_2$—complex amplitude of the SW
$A_3$—complex amplitude of the ASW
$\rho_1$—complex amplitude of the $AW_1$ caused by interaction of CW & SW
$\rho_1$—complex amplitude of the $AW_2$ caused by interaction of CW & ASW
$\Omega_B$—Brillouin frequency: $\Omega_B = 2n \cdot v/c \cdot \omega_1$
c—speed of light
$\rho_0$—density of the fiber
$\gamma_3$—electrostrictive constant
z—coordinate along the fiber
n—index of refraction of the fiber
v—speed of sound in the fiber
$\Gamma_B$—Brillouin linewidth
$\omega_1$—angular frequency of the CW
$\omega_2$—angular frequency of the SW
$\omega_3$—angular frequency of the ASW The following analysis is shown for the CW and SW configuration, but may be easily applied to the CW and ASW configuration. The complex amplitudes of the wave are represented in the polar form as $A=|A|e^{i\Phi}$, intensities are introduced as $$I = \frac{nc}{2\pi}|A|^2,$$

and the following dimensionless variables $l, Y_1, Y_2, Y_3, Y_4, Y_5$ are introduced by the following relations:

$$l = \frac{z}{L}; \; Y_2 = \frac{I_2}{I_{20}}; \; Y_3 = \frac{I_3}{I_{30}}; \; Y_4 = \left|\frac{\rho_1}{\rho_0}\right|^2; \; Y_5 = \left|\frac{\rho_2}{\rho_0}\right|^2 \quad \text{(eq. 3)}$$

The intensities $I_{10}$, $I_{20}$ and $I_{30}$, which represent the initial intensities of the CW, the SW and the ASW, are chosen sufficiently high so that SBS is induced. Corresponding powers, for a single mode fiber of core radius of 5 μm and launching efficiency of 90% is $P_{pump}$<10 mW, and $P_{probe}$<40 mW, where $P_{pump}$ is the pump power, and $P_{probe}$ is the probe power.

The systems of equations (1) and (2) are transformed into the following extended system of equations:
For the CW and SW interaction:

$$\frac{dY_1}{dl} = \beta_1 Y_1 Y_2 \quad \text{(eq. 4.1)}$$

$$\frac{dY_2}{dl} = \beta_3 Y_1 Y_2 \quad \text{(eq. 4.2)}$$

$$\frac{d\phi_1}{dl} = \beta_5 Y_2 \quad \text{(eq. 5.1)}$$

$$\frac{d\phi_2}{dl} = \beta_7 Y_1 \quad \text{(eq. 5.2)}$$

And for the CW and ASW interaction:

$$\frac{dY_1}{dl} = -\beta_2 Y_1 Y_2 \quad \text{(eq. 6.1)}$$

$$\frac{dY_3}{dl} = -\beta_4 Y_1 Y_3 \quad \text{(eq. 6.2)}$$

$$\frac{d\phi_1}{dl} = -\beta_6 Y_3 \quad \text{(eq. 7.1)}$$

$$\frac{d\phi_3}{dl} = \beta_8 Y_1 \quad \text{(eq. 7.2)}$$

where:
$\phi_1$—phase of continuous wave; $\phi_2$—phase of Stokes wave; $\phi_3$—phase of anti-Stokes wave,
and where the β-coefficients are as defined in expressions (8.1)-(8.8) below, with $\xi_1, \xi_2$ defined in (eq. 11).

$$\beta_1 = \frac{2\gamma_e^2 k^3}{n^3 c \rho_0 \Omega_1 \Gamma_B} \cdot \frac{1}{1+\xi_1^2} I_{20} L \quad \text{(eq. 8.1)}$$

$$\beta_2 = \frac{2\gamma_e^2 k^3}{n^3 c \rho_0 \Omega_2 \Gamma_B} \cdot \frac{1}{1+\xi_2^2} I_{30} L \quad \text{(eq. 8.2)}$$

$$\beta_3 = \frac{\omega_2}{\omega_1} \cdot \frac{I_{10}}{I_{20}} \beta_1 \quad \text{(eq. 8.3)}$$

$$\beta_4 = \frac{\omega_3}{\omega_1} \cdot \frac{I_{10}}{I_{30}} \beta_2 \quad \text{(eq. 8.4)}$$

$$\beta_5 = \frac{\gamma_e^2 k^3}{n^3 c \rho_0 \Omega_1 \Gamma_B} I_{20} L \cdot \frac{\xi_1}{1+\xi_1^2} \quad \text{(eq. 8.5)}$$

$$\beta_6 = \frac{\gamma_e^2 k^3}{n^3 c \rho_0 \Omega_2 \Gamma_B} I_{30} L \cdot \frac{\xi_2}{1+\xi_2^2} \quad \text{(eq. 8.6)}$$

$$\beta_7 = \frac{\gamma_e^2 k^3}{n^3 c \rho_0 \Omega_1 \Gamma_B} \frac{\omega_2}{\omega_1} I_{10} L \cdot \frac{\xi_1}{1+\xi_1^2} \quad \text{(eq. 8.7)}$$

$$\beta_8 = \frac{\gamma_e^2 k^3}{n^3 c \rho_0 \Omega_2 \Gamma_B} \frac{\omega_3}{\omega_1} I_{10} L \cdot \frac{\xi_2}{1+\xi_2^2} \quad \text{(eq. 8.8)}$$

The sub-system of equations (eq. 4.1) and (eq. 4.2) for the CW and SW interaction, and the sub-system of equations (eq. 6.1) and (eq. 6.2) for the CW and ASW interaction, can be solved independently of the remaining sub-systems of equations (eq. 5.1) and (eq. 5.2) for the CW and SW interaction, and equations (eq. 7.1) and (eq. 7.2) for the CW and ASW interaction, to determine the intensities of the interacting optical waves $Y_1$ and $Y_2$ and $Y_3$.

Many important properties of the equations (eq. 5.1) and (eq. 5.2), and (eq. 7.1) and (eq. 7.2) can be studied even before the formal solution for the intensities are obtained. In both the CW and SW, and the CW and ASW interaction:

a) The rate of change of the phase of the pump wave (1c) is proportional to the intensity of the probe wave (2c) and does not depend on the intensity of the pump wave (1c). Similarly, the rate of change of the phase of the probe wave (2c) is proportional to the intensity of the pump wave (1c) and does not depend on the intensity of the probe wave (2c).

b) The rates of change of both optical waves, the pump and the probe wave, (1c) and (2c) respectively, have common β-coefficients of proportionality, as defined in (eq. 8.1)-(eq. 8.8) above. The β-coefficients are comprised of two factors, the first factor being the line-center gain factor for the intensities of the optical waves:

$$g_1 = \frac{\gamma_e^2 k^3}{n^3 c \rho_0 \Omega_1 \Gamma_B} I_{20} L \quad \text{(eq. 9.1)}$$

$$g_2 = \frac{\gamma_e^2 k^3}{n^3 c \rho_0 \Omega_2 \Gamma_B} I_{30} L \quad \text{(eq. 9.2)}$$

$$g_3 = \frac{\gamma_e^2 k^3}{n^3 c \rho_0 \Omega_1 \Gamma_B} \frac{\omega_2}{\omega_1} I_{10} L \quad \text{(eq. 9.3)}$$

$$g_4 = \frac{\gamma_e^2 k^3}{n^3 c \rho_0 \Omega_2 \Gamma_B} \frac{\omega_3}{\omega_1} I_{10} L \quad \text{(eq. 9.4)}$$

The second factor is a form factor $$F_i(\xi_i) = \frac{\xi_i}{\xi_i^2 + 1}, \; i = 1, 2 \quad \text{(eq. 10)}$$

with $$\xi_i = \frac{\Omega_B^2 - \Omega_i^2}{\Omega_i \Gamma_B} \quad \text{(eq. 11)}$$

Figure 2:
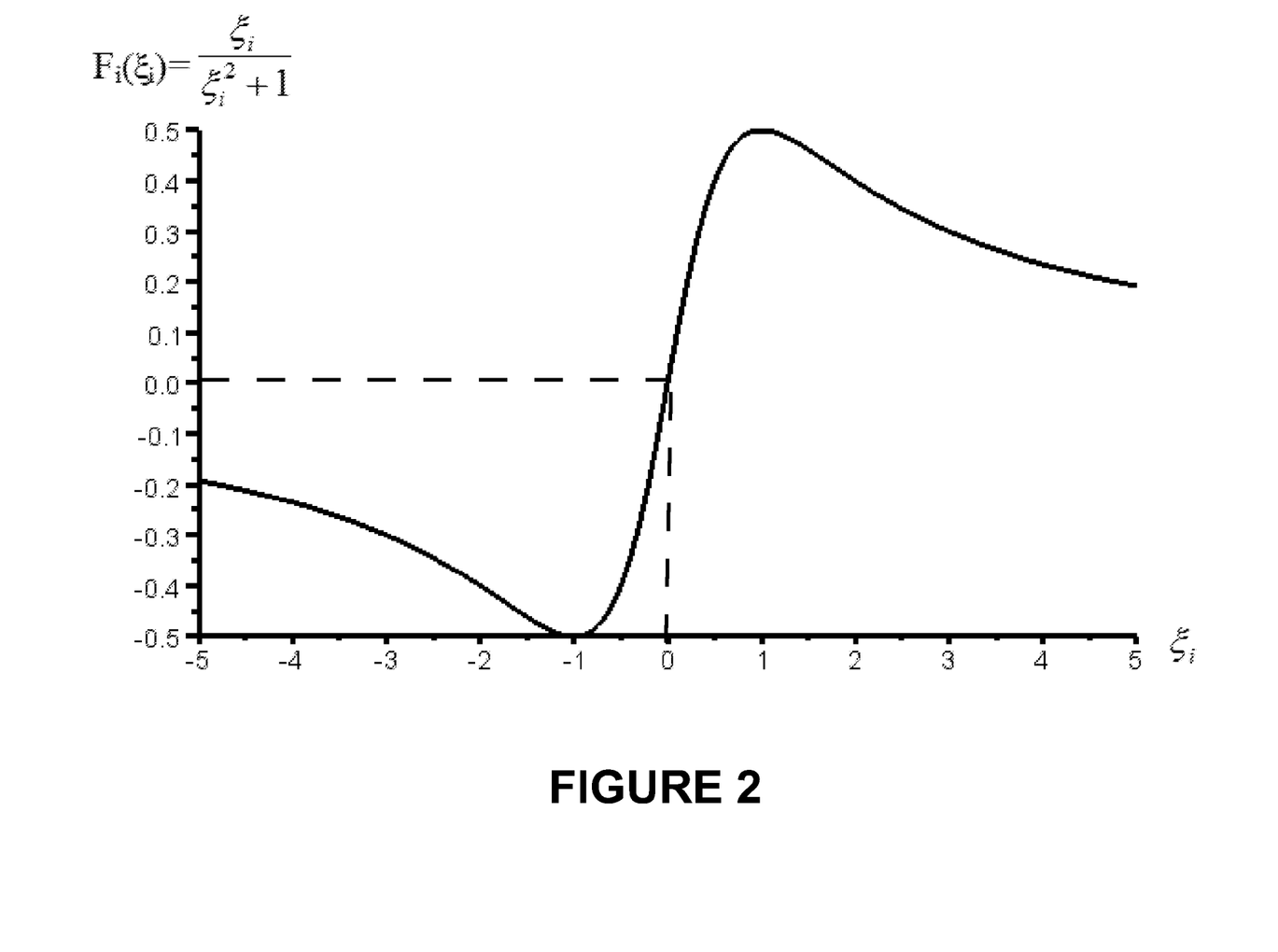
FIG. 2 is a graph illustrating the dependence of the form factor $F(\xi_i)$, determining the shape of the phase spectra of the interacting waves, as a function of $$\xi_i = \frac{\Omega_B^2 - \Omega_i^2}{\Omega_i \Gamma_B};$$

The form factor, determines the shape of the phase spectra of the interacting waves. The graph of the form factor $F_i(\xi)$ is shown in FIG. 2.

Since $F_i(\xi_i)$ has two extrema at $\xi_i=\pm 1$, the optimum conditions for observing a phase change occur when $$\frac{\Omega_B^2 - \Omega_i^2}{\Omega_i \Gamma_B} \quad \text{(eq. 12)}$$

Since $\Omega_i$ differs very little from the resonant Brillouin frequency, $\Omega_B$, for many practical cases, we may apply the approximation $\Omega_i+\Omega_B \approx 2\Omega_i$, and the optimum condition for observing the phase change becomes as follows:

$$\Omega_i \approx \Omega_B \pm \frac{\Gamma_B}{2} \quad \text{(eq. 13)}$$

In other words, for an intensity spectra having a substantially Lorentzian shape, the optimal phase change occurs when the pump wave (1c), or the probe wave (2c), or both, are detuned from the resonant Brillouin frequency, $\Omega_B$, by about half of the Brillouin linewidth, $\Gamma_B$, of the optical fiber (3c).

Though not optimal, for other values of detuning off the resonant Brillouin frequency between the pump wave (1c) and probe wave (2c), the phase change also occurs. For example, the difference of frequencies of the pump wave (1c) and the probe wave (2c) may be conveniently chosen within a range of about +/−25% from half a Brillouin linewidth.

It must be confirmed that the optimal condition (eq. 12) does not lead to a negligibly small intensity of the interacting waves off-resonance. Performing a similar analysis on the equations (eq. 5.1) and (eq. 5.2), and (eq. 7.1) and (eq. 7.2) describing the rate of change of the intensity of all three optical waves CW, SW and ASW, we note that the equations have common gain factors (eq. 14.1) and (eq. 14.2):

$$G_1(\xi_1) = \frac{1}{1+\xi_1^2} \quad \text{(eq. 14.1)}$$

$$G_2(\xi_2) = \frac{1}{1+\xi_2^2} \quad \text{(eq. 14.2)}$$

Figure 3:
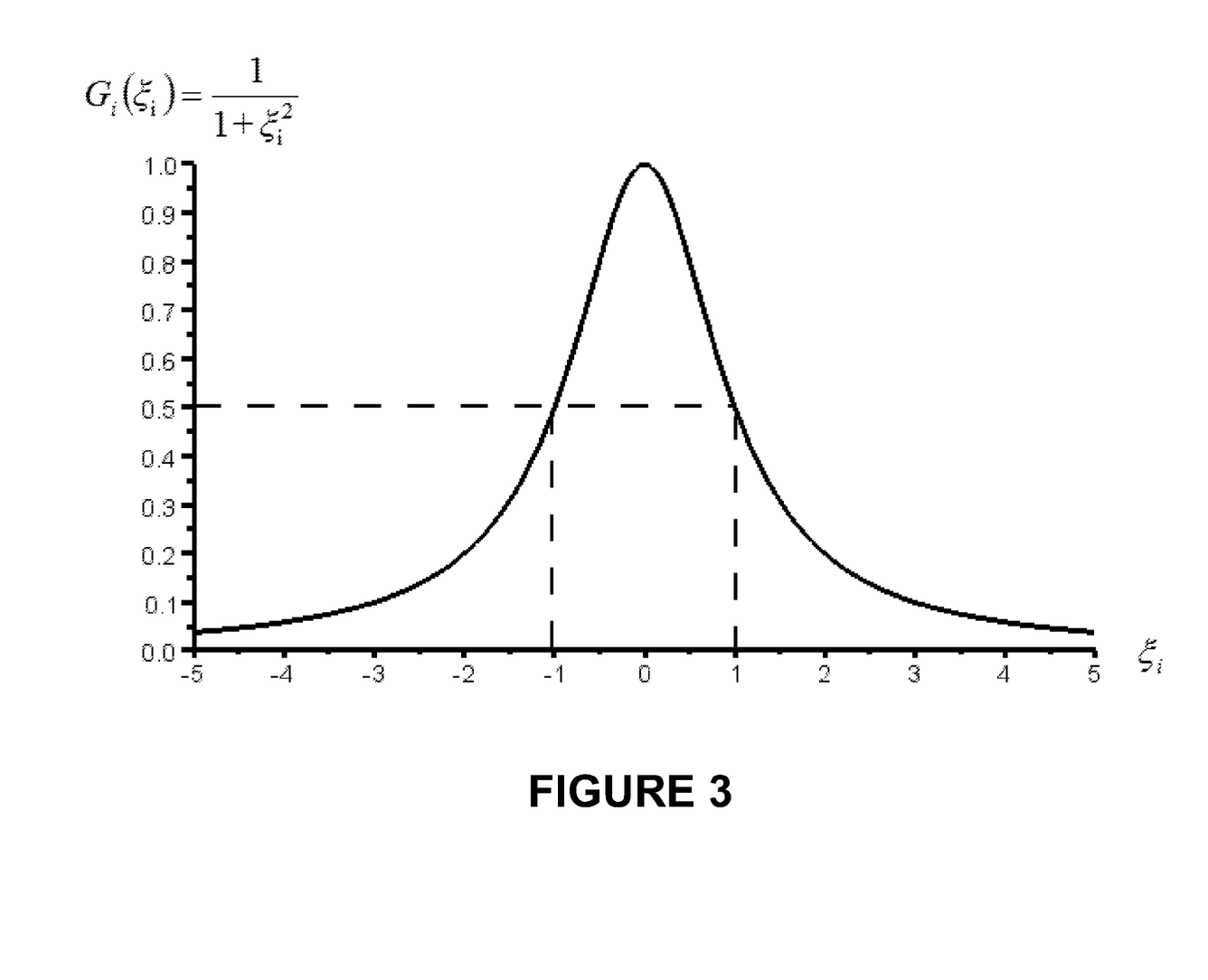
FIG. 3 is a graph illustrating the dependence of the gain factor $G(\xi_i)$ as a function of $$\xi_i = \frac{\Omega_B^2 - \Omega_i^2}{\Omega_i \Gamma_B};$$

The graph of $G_i(\xi_i)$ is shown on FIG. 3, from which it can be seen that $G_i(\pm 1)=\frac{1}{2}$, which implies that when the angular frequency of the AW$_1$ or AW$_2$ follows the relation:

$$\Omega_i \approx \Omega_B \pm \frac{\Gamma_B}{2},$$

the off-resonance gain factor drops only by 50%, as compared with the gain factor at $\xi_i=0$ (line-center gain factor). This means that the optimum condition (eq. 12) leads to sufficient intensities, from an experimental point of view, of the interacting waves.

From observation of FIG. 2, it may be concluded that $$F_i(0)=0 \quad \text{(eq. 15)}$$

For which we have $\beta_5=\beta_6=\beta_7=\beta_8=0$, and therefore $$\frac{\partial \phi_i}{\partial z} = 0 \text{ when } \Omega_i = \Omega_B, i=1, 2 \quad \text{(eq. 16)}$$

In other words,
At the resonant Brillouin frequency, the phases of the pump wave (1c) and the probe wave (2c) remain constant at every point in the fiber.
Likewise, off-resonance, i.e. when $\Omega_i \neq \Omega_B$, i=1, 2, we have $$|F_i(\xi)|>0 \quad \text{(eq. 17)}$$

For which we have $\beta_5, \beta_6, \beta_7, \beta_8>0$. Therefore, $$\frac{\partial \phi_i}{\partial z} \neq 0, i=1, 2. \quad \text{(eq. 18)}$$

In other words,
The phases of the pump wave (1c) and probe wave (2c) change along the fiber if $\Omega_1 \neq \Omega_B$ or $\Omega_2 \neq \Omega_B$ i.e detuned from resonant Brillouin frequency.

The Experimental Setup

Figure 4:
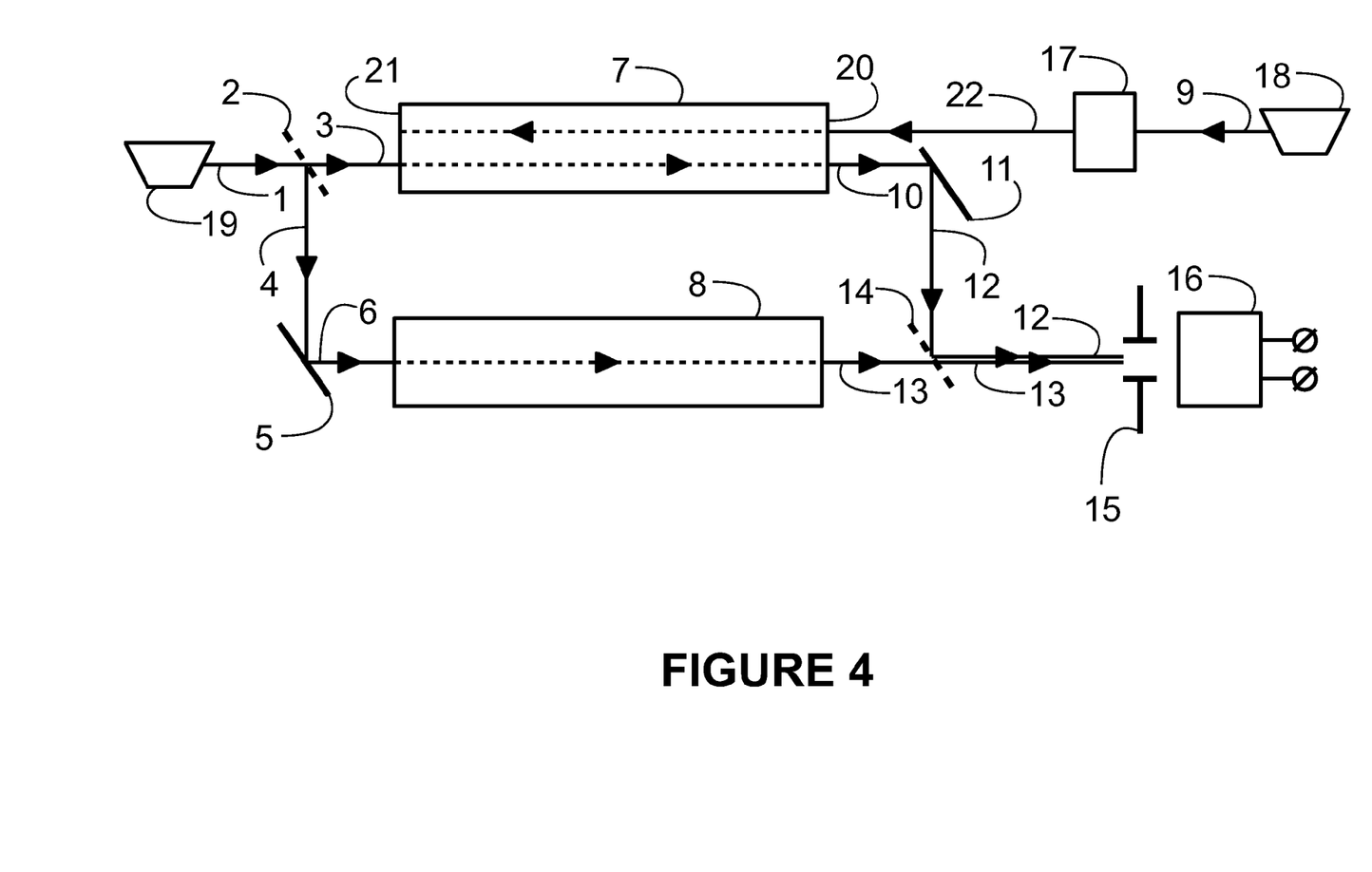
FIG. 4 is a schematic illustration of the experimental setup for demonstrating the method of optical phase modulation and the functionality of the optical phase modulator of the embodiments of the invention.

The experimental setup for demonstrating the method of optical phase modulation and the functionality of the optical phase modulator of the embodiments of the invention is shown in FIG. 4. Although FIG. 4 illustrates an embodiment involving the CW and SW configuration, the setup may also be applied to the CW and ASW configuration.

The experimental setup is comprised of a probe laser source (19), a beamsplitter (2), a pump laser source (18), an electronic variable attenuator, eVOA (17), which is used as a source of amplitude modulation, an active Brillouin scattering optical fiber (7), a path equalizing optical fiber (8), a first and second reflective mirror, (5) and (11) respectively, a semi-transparent mirror (14), a screen with tiny aperture (15), and a photodiode (16).

The experimental setup of FIG. 4 operates as follows.

The pump laser source (18), for example a tunable laser source, generates a pump wave (9), for example a continuous wave, which passes through the eVOA (17). The resulting wave is an amplitude modulated pump wave (22), which is injected into one end of the optical fiber (20). The probe laser source (19), for example a tunable laser source, generates a probe wave (1), for example a Stokes wave, encounters the beamsplitter (2), and is split an incident probe wave (3) and a first reference optical signal (4). The incident probe wave (3) is injected into an opposite end of the optical fiber (21), such that the incident probe wave (3) and the amplitude modulated pump wave (22) counter-propagate in the active Brillouin scattering optical fiber (7), causing the phase of the incident probe wave (3) to change along its way in the active Brillouin scattering optical fiber (7), according to the (eq. 5.2).

For clarity of the experimental setup of FIG. 4, the second reflective mirror (11) is schematically shown as spatially separated from the pump wave (9). In practice, the second reflective mirror (11) is replaced with a second semi-transparent mirror.

In accordance with the theory recommendations in the section above, the frequency of the probe wave (1) is detuned from the resonant Brillouin frequency to create conditions necessary for the phases of the amplitude modulated pump wave (22) and the incident probe wave (3) to change. Preferably, the frequency of the probe wave (1) is chosen to satisfy the optimal conditions as described in (eq. 13) above, to induce maximum phase change, thereby making it easier to measure. An output probe wave (10), with the phase changed in accordance with the chosen attenuation of the eVOA (17), is reflected off the second reflective mirror (11), at about a 90 degree angle, creating a phase-modulated probe beam (12).

The first reference optical signal (4) is reflected at about a 90 degree angle off a first reflective mirror (5), to create a second reference optical signal (6), which is passed through a path equalizing optical fiber (8) that is substantially identical to the active Brillouin Scattering optical fiber (7) in all respects. The result is an output reference beam (13) which exits the path equalizing optical fiber (8), the purpose of which is to equalize the optical path for the first reference optical signal (4) with the optical path of the incident probe wave (3), keeping both mutually coherent. Since the typical coherence length of a typical laser, such as He—Ne laser, is around 20 cm, the difference in optical paths between the active Brillouin Scattering optical fiber (7) and the path equalizing optical fiber (8) should be much smaller than 20 cm, preferably not exceeding several centimeters. For laser sources with a different coherence length, the difference in the optical path should be adjusted accordingly.

The output reference beam (13) passes through a semi-transparent mirror (14), while the phase-modulated probe beam (12) is reflected from the semi-transparent mirror (14), such that both the output reference beam (13) and the phase-modulated probe beam (12) converge to create an interference pattern on the screen with tiny aperture (15). The angle of convergence is selected to be small enough (preferably substantially smaller than 1', or about 1/3600 radian) to widen the interference pattern—10 mm wide interference pattern has been found sufficiently convenient to work with. The required convergence angle can be estimated from the expression $2d \cdot \sin(\theta) = \lambda$, where $\lambda$ is the wavelength, d is the width of the interference patterns, and $2\theta$ is the convergence angle between the phase-modulated probe beam (12) and the output reference beam (13).

When the interference pattern becomes visible, the convergence angle can be adjusted experimentally as required. To maintain the stability of the interference pattern for the interval of time required for measurements (presumably ~5-10 min), the entire setup is preferably mounted on an anti-vibrational table or breadboard, such as produced by Newport Corporation.

The aperture on the screen with tiny aperture (15) is chosen to be much smaller in diameter than the width of the light and dark bands of the interference pattern, which permits the light from the interference pattern to be detected by the photodiode (16). Initially, the aperture is adjusted to occupy a position of an interference pattern at about a middle point between a light and a dark band of the interference pattern, which provides for a substantially linear region of intensity variation. When the eVOA (17) is controlled to a different attenuation from the initial attenuation, the phase of the output probe wave (10) is expected to change relative to the phase of the output reference beam (13), causing the light and dark bands of the interference pattern to change locations relative to the aperture in the transverse direction. Therefore, the amount of light that reaches the photodiode (16) changes approximately proportionally to the phase shift, allowing the phase shift to be measured.

A controllable change of attenuation of the eVOA (17) allows for the measurement of the phase shift versus the intensity of the amplitude modulated pump wave (22). Simulation results are shown in Table 1.

TABLE 1

Simulation results for the experimental setup

| Parameters of the Fiber | Detuning | Phase Change of SW (rad) |
|---|---|---|
| $\gamma_e = 0.902$ | $\Omega_i \approx \Omega_B \pm 0.5\Gamma_B$ | ~1.2 |
| $\omega_1 = 8.381097 \times 10^5$ GHz | (optimal conditions) | ~0.2 |

TABLE 1-continued

Simulation results for the experimental setup

| Parameters of the Fiber | Detuning | Phase Change of SW (rad) |
|---|---|---|
| $\omega_2 = 8.380691 \times 10^5$ GHz | $\Omega_i \approx \Omega_B \pm 0.25\Gamma_B$ | ~0.08 |
| $\Omega_1 = 4.053668 \times 10^1$ GHz | $\Omega_i \approx \Omega_B \pm 0.1\Gamma_B$ | |
| $\Omega_B = 4.053668 \times 10^1$ GHz | | |
| n = 1.45, c = 299792.458 km/s | | |
| v = 5000 m/s, $\rho_0 = 2.21$ g/cm$^3$ | | |
| $\Gamma_B = 0.1$ GHz, L = 1000 m | | |
| Real initial CW intensity: | | |
| $I_{10} = 12000$ W/cm$^2$ | | |
| Real initial SW intensity: | | |
| $I_{20} = 1200$ W/cm$^2$ | | |
| CW power of $P_{CW} = 10$ mW | | |
| SW power of $P_{SW} = 9$ mW | | |

As can be seen from Table 1, the phase change of the output probe wave (10) is sufficiently large and suitable for conducting measurements. It has also been noticed that, when the pump wave (9) is amplitude modulated, the phase change of the output probe wave (10) is larger for pump waves experiencing larger depletion, for example, when the depletion of the pump wave is larger than about 50%.

In another embodiment, the probe wave (1) is an anti-Stokes wave. Also, the probe wave (1) can be amplitude modulated instead of the pump wave (9), thus causing the phase modulation of the pump wave (9).

Optical Phase Modulator

Figure 5:
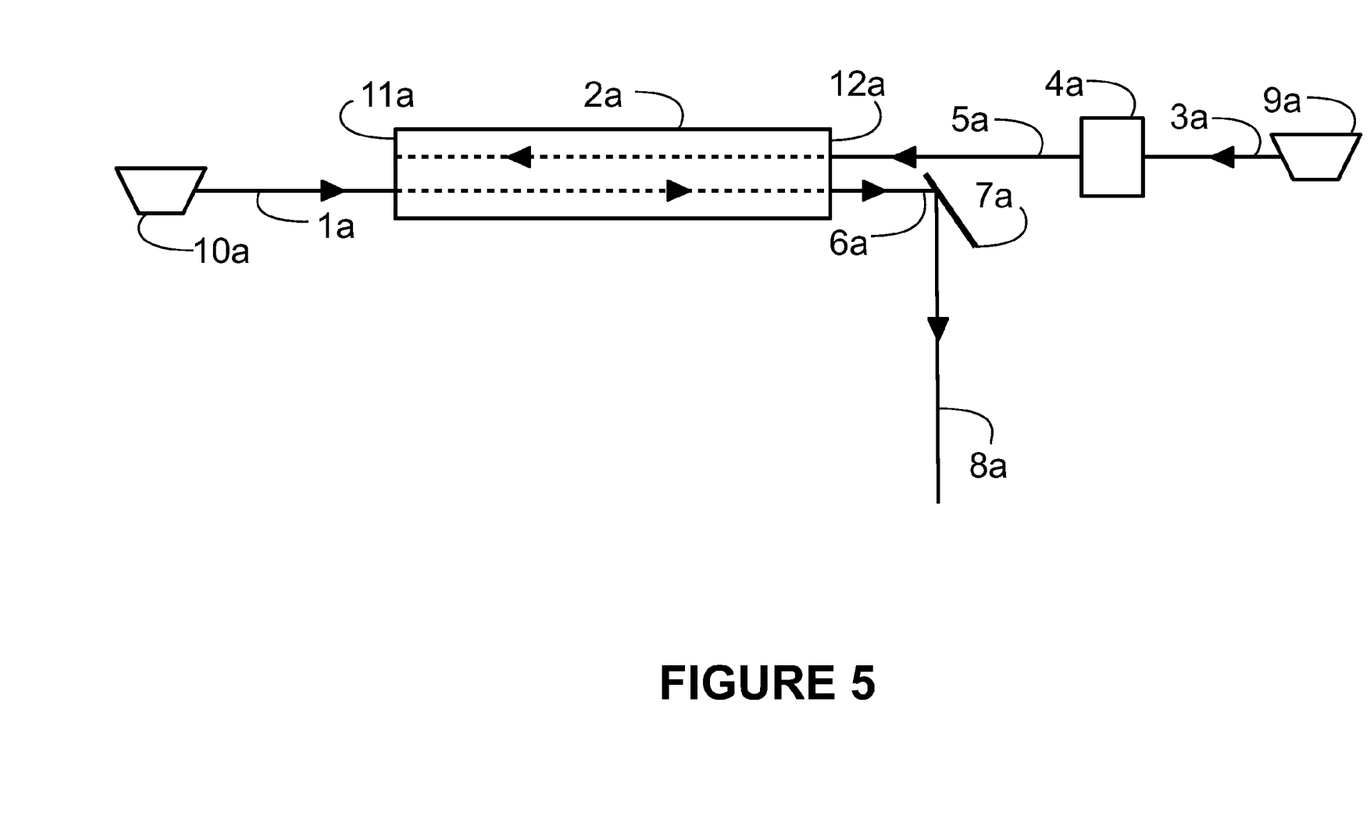
FIG. 5 is a schematic illustration of the optical phase modulator of the embodiment of the invention.

The optical phase modulator of the embodiments of the invention is shown in FIG. 5. It comprises an active Brillouin scattering optical fiber (2a), a probe laser source (10a), for example a tunable laser source, a pump laser source (9a), for example a tunable laser source, an amplitude modulator (4a), and a reflective mirror (7a).

For clarity of the setup of FIG. 5, the reflective mirror (7a) is schematically shown being spatially separated from an amplitude modulated pump wave (5a). In practice, the reflective mirror (7a) is replaced with a semi-transparent mirror.

In the preferred embodiment of the invention shown in FIG. 5, the pump laser source (9a), generates a pump wave (3a), the amplitude of which is modulated by a low frequency signal (for example speech signal, which is not shown) using the amplitude modulator (4a). The resulting amplitude modulated pump wave (5a) is injected into one end of the optical fiber (12a). A probe wave (1a), for example Stokes wave, is generated by the probe laser source (10a), that is injected into an opposite end of the optical fiber (11a), such that the two waves counter-propagate in the active Brillouin scattering optical fiber (2a). The probe laser source (10a), for example a tunable laser source, is used to detune the frequency of the probe wave (1a) from the resonant Brillouin frequency, causing the phase of the probe wave (1a) to change in accordance with the intensity of the amplitude modulated pump wave (5a). Preferably, the frequency of the probe wave (la) is chosen to satisfy the optimal conditions (eq. 13), or to tune the difference to about half of a Brillouin linewidth of the optical fiber, to make the phase change as large as possible, to improve a signal-to-noise ratio (SNR). An output probe wave (6a), for example the Stokes wave, at the one end of the optical fiber (12a), the phase of which has already been modulated, is reflected off the reflective mirror (7a), creating a phase modulated probe wave (8a) carrying the signal, e.g., phase modulated speech signal.

In another embodiment of the invention (not illustrated in the drawings), the probe wave (la) is amplitude modulated independently of the phase modulation obtained according to the embodiments of the present invention, thus allowing for doubling the amount of information carried by the same phase modulated probe wave (8a).

In yet another embodiment of the invention, the probe wave (1a) is an anti-Stokes wave.

In yet another embodiment, the probe wave (1a) can be amplitude modulated instead of the pump wave (3a), thus causing the phase modulation of the pump wave (3a).

Optical Network Transmission Lines With Phase-Modulated Carriers

The embodiment of the invention allows for the transmission of a low frequency signal through an optical fiber, via the phase-modulated carrier and demodulation of the carrier into the original low frequency signal.

Figure 6:
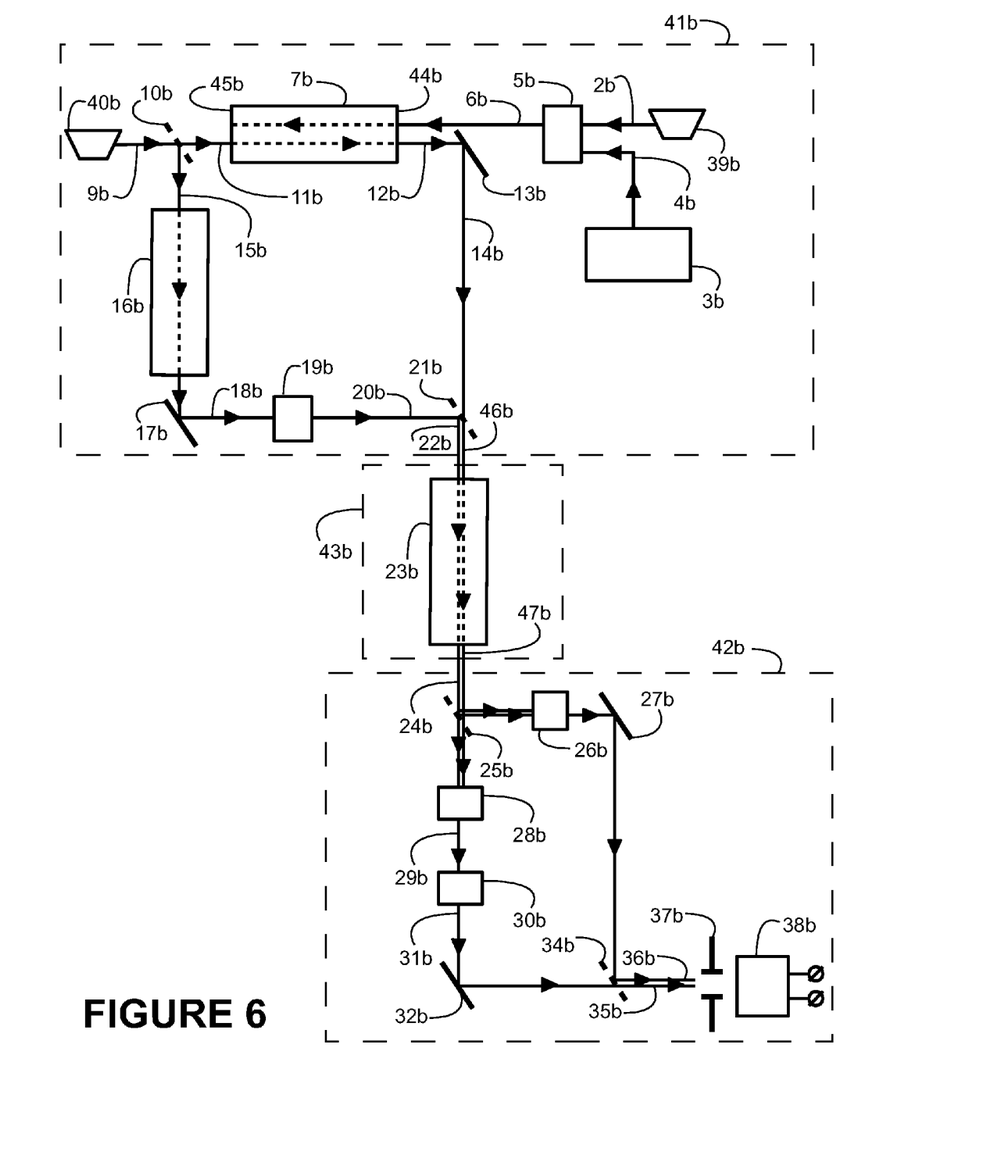
FIG. 6 is a schematic illustration of the optical network, employing the optical phase modulator of FIG. 5.

An optical network utilizing the principles of the optical phase modulation of the embodiments of the present invention is shown in FIG. 6.

The optical network of FIG. 6 comprises a transmitting end of the optical network (41b), and a receiving end of the optical network (42b), which are connected via a path in the optical network (43b). The transmitting end of the optical network (41b) comprises a pump laser source (40b), a first beamsplitter (10b), a probe laser source (39b), an amplitude modulator (5b), a low frequency (LF) signal generator (3b), an active Brillouin scattering optical fiber (7b), a passive path equalizing optical fiber (16b), a first and second reflective mirror (13b), (17b) respectively, a first quarter-wave plate (19b), and a first semi-transparent mirror (21b).

The receiving end of the optical network (42b) comprises a second beamsplitter (25b), a first and second polarization filter (26b) and (28b) respectively, a second quarter-wave plate (30b), a third and fourth reflective mirror (27b) and (32b) respectively, a second semi-transparent mirror (34b), a screen with a pinhole (37b), and a photodetector (38b).

The path in the optical network (43b) comprises a telecommunication fiber (23b) acting as a transmission channel.

For clarity of the setup of FIG. 6, the first reflective mirror (13b) is schematically shown as spatially separated from an amplitude modulated (AM) carrier (6b). In practice, the first reflective mirror (13b) is replaced with a third semi-transparent mirror.

The pump laser source (40b), for example a tunable laser source, generates a pump wave (9b), for example a continuous wave. The pump wave may also be referred to as a first optical signal. The first beamsplitter (10b) acts to split the pump wave (9b) into a pump wave to be phase modulated (11b) and a reference optical signal (15b), both with parallel polarization.

The probe laser source (39b), for example a tunable laser source, generates a probe wave (2b), for example a Stokes wave. The probe wave may also be referred to as a second optical signal. The probe wave (2b), and a low frequency signal (4b), which is generated by the low frequency signal generator (3b), are sent to the amplitude modulator (5b), which generates an amplitude-modulated wave, or AM carrier (6b). The AM carrier (6b) is injected into one end of the optical fiber (44b). The pump wave to be phase modulated (lib) is injected into an opposite end of the optical fiber (45b). The pump wave to be phase modulated (11b) and the AM carrier (6b) counter propagate inside the active Brillouin scattering optical fiber (7b), resulting in transforming the pump wave to be phase modulated (11b) into a phase modulated pump wave (12b), also with parallel polarization.

The phase modulated pump wave (12b) is reflected off the first reflective mirror (13b), at about a 90 degree angle, creating a phase modulated optical signal (14b). Likewise, the reference optical signal (15b) enters the passive path equalizing optical fiber (16b), which acts as an optical path equalizer, and is then reflected off the second reflective mirror (17b) at about a 90 degree angle, creating a reference wave (18b). The reference wave (18b) passes through the first quarter-wave plate (19b), which changes its polarization to a perpendicular polarization, resulting in a first perpendicular polarized reference beam (20b). The first perpendicular polarized reference beam (20b) is perpendicularly polarized, while the phase modulated optical signal (14b) is still parallel polarized.

The phase modulated optical signal (14b) passes through the first semi-transparent mirror (21b), resulting in a polarization perpendicular reference beam (22b), while the first perpendicular polarized reference beam (20b) is reflected, at about a 90 degree angle, resulting in a polarization parallel phase modulated beam (46b). Both the polarization perpendicular reference beam (22b) and the polarization parallel phase modulated beam (46b), which in FIG. 6 are drawn separate from each other only for the purpose of clarity, enter the telecommunication fiber (23b). Upon exiting the telecommunication fiber (23b), the polarization perpendicular reference beam (22b) becomes a destination reference beam (24b), and the polarization parallel phase modulated beam (46b) becomes a destination phase modulated beam (47b). Both the destination reference beam (24b) and the destination phase modulated beam (47b) encounter the second beamsplitter (25b), which redirects them to the first and second polarization filters, (26b) and (28b) respectively.

The first polarization filter (26b) allows only the destination phase modulated beam (47b) to pass through, to be reflected off the third reflective mirror (27b), as well as the second semi-transparent mirror (34b), to produce a converging phase modulated beam (36b). The polarization filter (28b) allows only the destination reference beam (24b) to pass through, creating a second perpendicular polarized reference beam (29b). The resulting second perpendicular polarized reference beam (29b) passes through the second quarter-wave plate (30b), which rotates its polarization to parallel, resulting in a first parallel polarized reference beam (31b). The first parallel polarized reference beam (31b) is reflected off the fourth reflective mirror (32b), and passes through the second semi-transparent mirror (34b), producing a converging reference beam (35b).

The resulting converging phase modulated beam (36b) and the converging reference beam (35b), both with the same polarization, converge at a small angle (preferably smaller than 1', or about 1/3600 radian), and overlap on a screen with a pinhole (37b). The light passing through is detected by the photodetector (38b). When the phase of the converging phase modulated beam (36b) changes (due to the phase modulation) relative to the phase of the converging reference beam (35b), the interference pattern, of variable intensity, shifts in the transverse direction approximately proportionally to the change in phase. As a result, the intensity of light which passes through the screen with a pinhole (37b) also changes respectively. In this way, the low frequency signal (4b) is decoded from converging phase modulated beam (36b). Consequently, we were able to transmit the low frequency signal (4b) through an optical network to its destination and restore it at this destination.

In another embodiment of the invention, the probe wave (2b) is an anti-Stokes wave.

In yet another embodiment of the invention, the pump wave (9b) is amplitude modulated by the amplitude modulator (5b), independently of the phase modulation obtained in the embodiment of the invention.

In yet another embodiment, the pump wave (9b) can be amplitude modulated instead of the probe wave (2b), thus causing the phase modulation of the probe wave (9b).

In yet another embodiment, instead of using two differently polarized beams, the phase modulated optical signal (14b) and the first perpendicular polarized reference beam (20b), propagating through the same telecommunication fiber (23b), two separate fibers with substantially similar characteristics could be used so that one fiber propagates the phase modulated optical signal (14b), while another fiber propagates the first perpendicular polarized reference beam (20b). In this case, both the phase modulated optical signal (14b) and the first perpendicular polarized reference beam (20b) may have similar polarization, and the second quarter-wave plate (30b) will not be needed for producing the interference pattern.

Although the embodiments of the invention have been described in detail, it will be apparent to one skilled in the art that variations and modifications to the embodiment may be made within the scope of the following claims.

What is claimed is:

1. A method for optical phase modulating, comprising:
   injecting a pump wave into one end of an optical fiber, and a probe wave into an opposite end of the optical fiber, such that the pump wave and the probe wave counter-propagate in the optical fiber, the pump wave and the probe wave being selected such that to cause stimulated Brillouin scattering in the optical fiber;
   choosing frequencies of the pump wave and the probe wave prior to the injecting such that a difference thereof differs from a resonant Brillouin frequency of the optical fiber; and
   amplitude modulating the pump wave or the probe wave prior to the injecting to achieve phase modulation of the probe wave or the pump wave respectively.

2. The method as described in claim 1, wherein the injecting the probe wave comprises:
   injecting a Stokes wave; or
   injecting an anti-Stokes wave.

3. The method as described in claim 1, wherein the amplitude modulating comprises:
   amplitude modulating the pump wave only, thereby phase modulating the probe wave; or
   amplitude modulating the probe wave only, thereby phase modulating the pump wave.

4. The method as described in claim 1, wherein the choosing comprises one of the following:
   detuning the frequency of the probe wave from the resonant Brillouin frequency; or
   detuning the frequency of the pump wave from the resonant Brillouin frequency; or
   detuning the frequency of both the pump wave and the probe wave from the resonant Brillouin frequency.

5. The method as described in claim 1, wherein the difference is about half of a Brillouin linewidth of the optical fiber.

6. The method as described in claim 1, wherein:
   the amplitude modulating comprises amplitude modulating the pump wave; and
   the injecting comprises propagating the pump wave in the optical fiber, such that depletion of the pump wave is larger than about 50%.

7. An optical phase modulator, comprising:
   an optical fiber;
   a pump laser source, injecting a pump wave into one end of the optical fiber;
   a probe laser source, injecting a probe wave into an opposite end of the optical fiber, such that the pump wave and the probe wave counter-propagate in the optical fiber;
   the pump wave and the probe wave being selected to cause stimulated Brillouin scattering in the optical fiber, and frequencies of the pump wave and the probe wave being selected so that a difference thereof differs from a resonant Brillouin frequency of the optical fiber; and
   an amplitude modulator, amplitude modulating the pump wave or the probe wave prior to the injecting to achieve phase modulation of the probe wave or the pump wave respectively.

8. The optical phase modulator as described in claim 7, wherein the amplitude modulator is configured to:
   amplitude modulate the pump wave only, thereby phase modulating the probe wave; or
   amplitude modulate the probe wave only, thereby phase modulating the pump wave.

9. The optical phase modulator as described in claim 7, wherein the probe laser source is a tunable laser source configured to generate the probe wave, which is:
   a Stokes wave; or
   an anti-Stokes wave.

10. The optical phase modulator as described in claim 7, wherein:
    the probe laser source is a tunable laser source configured to detune the frequency of the probe wave from the resonant Brillouin frequency; or
    the pump laser source is another tunable laser source configured to detune the frequency of the pump wave from the resonant Brillouin frequency; or
    both the probe laser source and the pump laser source are tunable laser sources configured to detune the frequency of both the pump wave and the probe wave from the resonant Brillouin frequency.

11. The optical phase modulator as described in claim 10, wherein said tunable laser source, said another tunable laser source and said tunable laser sources are configured to tune the difference to about half of a Brillouin linewidth of the optical fiber.

12. An optical network, comprising:
    an optical phase modulator, comprising:
       an optical fiber;
       a pump laser source, injecting a pump wave into one end of the optical fiber;
       a probe laser source, injecting a probe wave into an opposite end of the optical fiber, such that the pump wave and the probe wave counter-propagate in the optical fiber;
       the pump wave and the probe wave being selected to cause stimulated Brillouin scattering in the optical fiber, and frequencies of the pump wave and the probe wave being selected so that a difference thereof differs from a resonant Brillouin frequency of the optical fiber; and
    an amplitude modulator, amplitude modulating the pump wave or the probe wave prior to the injecting to achieve phase modulation of the probe wave or the pump wave respectively.

13. A node in an optical network, comprising:
    an optical phase modulator, comprising:
       an optical fiber;
       a pump laser source, injecting a pump wave into one end of the optical fiber;

a probe laser source, injecting a probe wave into an opposite end of the optical fiber, such that the pump wave and the probe wave counter-propagate in the optical fiber;

the pump wave and the probe wave being selected to cause stimulated Brillouin scattering in the optical fiber, and frequencies of the pump wave and the probe wave being selected so that a difference thereof differs from a resonant Brillouin frequency of the optical fiber; and an amplitude modulator, amplitude modulating the pump wave or the probe wave prior to the injecting to achieve phase modulation of the probe wave or the pump wave respectively.

14. A method of claim 1, wherein the injecting the probe wave comprises injecting one of a Stokes wave or an anti-Stokes wave.

15. A method for transmitting a phase modulated optical signal in an optical network, comprising:

(a) at a transmitting end of the optical network:
injecting a pump wave into one end of an optical fiber, and a probe wave into an opposite end of the optical fiber, such that the pump wave and the probe wave counter-propagate in the optical fiber, the pump wave and the probe wave being selected such that to cause stimulated Brillouin scattering in the optical fiber;

choosing frequencies of the pump wave and the probe wave prior to the injecting such that a difference thereof differs from a resonant Brillouin frequency of the optical fiber; and amplitude modulating one of the pump wave or the probe wave, prior to the injecting, to achieve phase modulation of the probe wave or the pump wave respectively to produce the phase modulated optical signal;

(b) transmitting the phase modulated optical signal over a path in the optical network; and (c) at a receiving end of the optical network, demodulating the phase modulated optical signal transmitted over the network.

16. The optical network of claim 12, wherein the amplitude modulator is configured to:
amplitude modulate the pump wave only, thereby phase modulating the probe wave; or
amplitude modulate the probe wave only, thereby phase modulating the pump wave.

17. The optical network of claim 12, wherein the probe laser source is a tunable laser source configured to generate the probe wave, which is:
a Stokes wave; or
an anti-Stokes wave.

18. The optical network of claim 12, wherein:
the probe laser source is a tunable laser source configured to detune the frequency of the probe wave from the resonant Brillouin frequency; or
the pump laser source is another tunable laser source configured to detune the frequency of the pump wave from the resonant Brillouin frequency; or
both the probe laser source and the pump laser source are tunable laser sources configured to detune the frequency of both the pump wave and the probe wave from the resonant Brillouin frequency.

19. The optical network of claim 18, wherein said tunable laser source, said another tunable laser source and said tunable laser sources are configured to tune the difference to about half of a Brillouin linewidth of the optical fiber.

20. The optical network of claim 12, wherein:
the amplitude modulator is configured to amplitude modulate the pump wave; and
the depletion of the pump wave is larger than about 50%.

21. The method of claim 1, wherein the choosing further comprises choosing the frequencies of the pump wave and the probe wave such that the difference thereof and the resonant Brillouin frequency is an absolute value, which is about 50% of the half of the Brillouin linewidth and centered around half of the Brillouin linewidth.

22. The optical phase modulator of claim 1, wherein the difference of frequencies of the pump wave and the probe wave and the resonant Brillouin frequency is an absolute value, which is about 50% of the half of the Brillouin linewidth and centered around half of the Brillouin linewidth.

23. The optical network of claim 12, wherein the difference of frequencies of the pump wave and the probe wave and the resonant Brillouin frequency is an absolute value, which is about 50% of the half of the Brillouin linewidth and centered around half of the Brillouin linewidth.

24. The method of claim 15, wherein the choosing further comprises choosing the frequencies of the pump wave and the probe wave such that the difference thereof and the resonant Brillouin frequency is an absolute value, which is about 50% of the half of the Brillouin linewidth and centered around half of the Brillouin linewidth.

* * * * *